(No Model.)

J. CATTON.
Plow Truck.

No. 242,431.  Patented June 7, 1881.

Witnesses.
W. Zimmerman
A. Cowles

Inventor
John Catton
By Gridley & Co
Atty

United States Patent Office.

JOHN CATTON, OF WEST JERSEY, ILLINOIS.

PLOW-TRUCK.

SPECIFICATION forming part of Letters Patent No. 242,431, dated June 7, 1881.

Application filed December 2, 1880. (No model.)

*To all whom it may concern:*

Be it known that I, JOHN CATTON, of West Jersey, in the county of Stark and State of Illinois, have invented certain new and useful Improvements in Sulky-Plows; and I hereby declare the following to be a full, clear, and exact description thereof, which will enable others skilled in the art to which my invention appertains to make and use the same, reference being had to the accompanying drawings, forming a part hereof, and in which—

Figure 1:
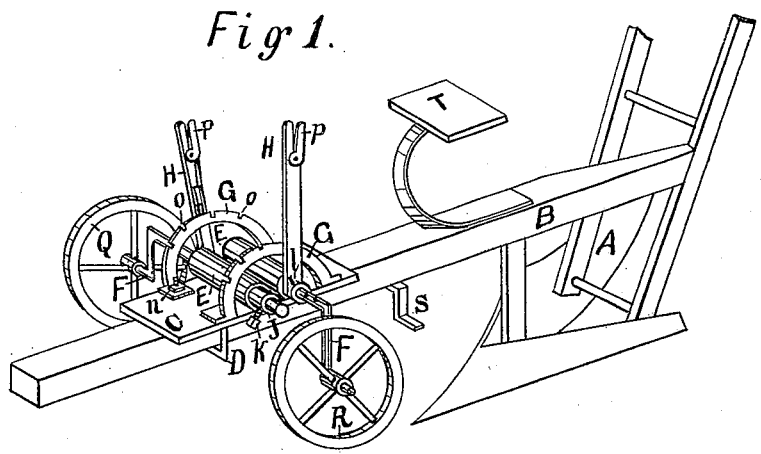
Figure 3:
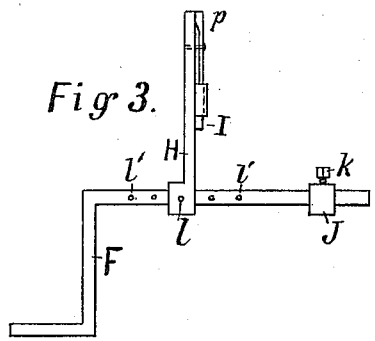
Figure 2:
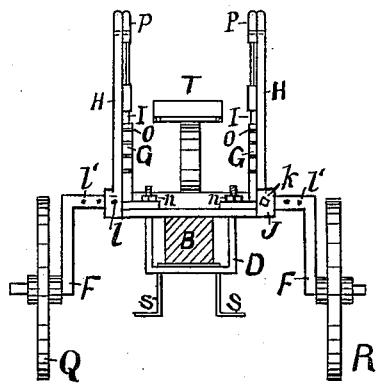
Figure 4:
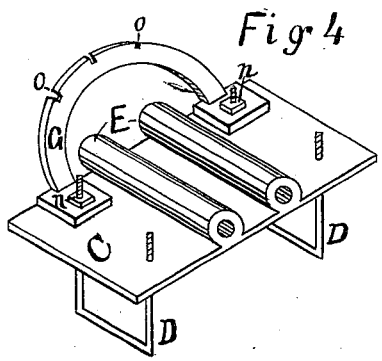

Figure 1 represents a plow in perspective with my improvements attached, and Fig. 2 represents a front view of the plow-beam with my improvements attached. Fig. 3 represents one of the axles with its adjusting lever and collar. Fig. 4 represents a perspective view of the adjustable plate, with its sockets and one of a pair of arched and notched segments attached.

Like letters of reference indicate like parts.

My invention relates to that class of plows in which a truck is attached to or near the front end of the beam, for the purpose of controlling the plow, substantially as hereinafter described.

In the drawings, A represents an ordinary plow, to the beam B of which is attached a plate, C, by means of clamps D, provided with nuts $n$. Said nuts also serve at the same time to unite and hold the segment G to the plate C. The plate C is also provided with two sockets, E, through each of which is passed one end of an axle, F, bent twice at right angles, as shown.

To each axle is attached a lever, H, provided with a spring-bolt, I, which catches in the notches $o$ of the segment, and which is worked by a lever, $p$.

The lever H is securely fastened to the axle by means of a bolt, $l$, which passes through it and the axle. The axles are provided with several holes, $l'$, for the purpose of adjusting the lever on one side of the plate C. On the other side thereof is a collar, J, through which passes a set-screw, $k$. The lever H may also be fixed to the axle by means of a set-screw in place of the pin $l$.

To the outer end of the axles are attached wheels Q and R. That on the land side may be made smaller than the wheel Q, which runs in the furrow.

The plate C, by means of its clamps, becomes adjustable, so that it may be set to and from the plow-point, and the clamps are made wider than the thickness of the plow-beam, so that it may also be adjusted in line with the landside of the plow, so that the wheels shall run parallel with it.

A driver's seat, T, is bolted on the beam, and stirrups S, formed from a bar of iron, as shown, are bolted to the beam at the desired point.

The operation of my plow is as follows, namely: The plate C, with its segment G, is first attached to the plow by means of the clamps D and nuts $n$, and the axles, each provided with its wheel and lever H, passed through the socket E and laterally adjusted. The collar J is then slipped on the end of the axle up to the plate C and fastened by the set-screw $k$. If the wheels are found to be in line, the nuts $n$ are then screwed up tight, which will securely hold the plate C, with its segment G, to the plow-beam. The parts being thus properly adjusted, the driver seats himself into the seat and throws the lever H, which governs the wheel R, forward, which operation throws the wheel R backward. This causes the front end of the plow-beam to descend, and also to tilt the plow slightly toward the landside and cause its point to enter the ground. The wheel Q may also be thrown backward in the same manner by its lever, and both wheels, by means of the segments G and spring-bolts I, may be set more or less backward, so that the plow may be made to enter any desired depth.

When it is desired to throw the plow out of the ground, both levers H are moved so as to bring the wheels Q and R perpendicularly under the sockets E. The hubs of the wheels, being considerably below the sockets E, cause a constant lifting or upward tendency of the rear of the plow over its axles when the draft is applied, and which, by means of the adjustable plate C, may be so regulated that the entire or greater part of the weight of the driver shall be thrown upon the wheels, and which may be further regulated by the draft being applied high in the clevis.

Having thus described my invention, what I claim as new, and desire to secure by Letters Patent, is—

A sulky-plow provided with an adjustable plate, C, provided with sockets E E, in combination with segments G, attached to the plate C, and laterally-adjustable crank-axles F F, provided with levers H, and bolts or stops I, working upon said segments, substantially as and for the purpose specified.

JOHN CATTON.

Witnesses:
 A. J. CATTON,
 ANN CATTON.